US012716510B2

(12) United States Patent
Söndgen et al.

(10) Patent No.: US 12,716,510 B2
(45) Date of Patent: Aug. 25, 2026

(54) PRESSURE-EQUALIZING DEVICE AND HOUSING HAVING SAME

(71) Applicant: Carl Freudenberg KG, Weinheim (DE)

(72) Inventors: Michael Söndgen, Bensheim (DE); Christian Kleinke, Darmstadt (DE); Christopher Schäfer, Ober-Ramstadt (DE); Janis Zimmermann, Reinheim (DE)

(73) Assignee: CARL FREUDENBERG KG, Weinheim (DE)

( * ) Notice: Subject to any disclaimer, the term of this patent is extended or adjusted under 35 U.S.C. 154(b) by 39 days.

(21) Appl. No.: 18/906,281

(22) Filed: Oct. 4, 2024

(65) Prior Publication Data

US 2026/0029060 A1 Jan. 29, 2026

(30) Foreign Application Priority Data

Jul. 24, 2024 (DE) ..................... 10 2024 120 985.2

(51) Int. Cl.
*F16K 17/164* (2006.01)

(52) U.S. Cl.
CPC .................................. *F16K 17/164* (2013.01)

(58) Field of Classification Search
None
See application file for complete search history.

(56) References Cited

U.S. PATENT DOCUMENTS 5,320,253 A * 6/1994 Robinson ............ A01M 7/0085 222/481.5
5,860,449 A * 1/1999 Schulte ............... F16K 15/1402 137/550
7,721,752 B2 * 5/2010 Stotkiewitz .......... B65D 77/225 137/533.19
10,529,969 B2 * 1/2020 Ogawa ................ F16K 17/0493
11,560,962 B2 * 1/2023 Nakayama ............. F16K 24/04
2018/0292020 A1 10/2018 Kleinke et al.
2021/0396324 A1 12/2021 Nakayama et al.

FOREIGN PATENT DOCUMENTS

DE 112019005336 T5 7/2021
DE 102023125545 A1 3/2024
EP 3385584 B1 9/2019

* cited by examiner

*Primary Examiner* — Matthew W Jellett
(74) *Attorney, Agent, or Firm* — LEYDIG, VOIT & MAYER, LTD.

(57) ABSTRACT

A pressure-equalizing device including a lattice-like cage with a gas passage opening through which gas can flow in a throughflow direction and which connects an inside and an outside of the device in a flow-conducting manner. The gas passage opening has an end face which faces toward the outside and which is covered by a gas-permeable membrane. The gas-permeable membrane is assigned a pressure-relief valve in a functional parallel configuration. The gas-permeable membrane and the pressure-relief valve jointly spatially separate the inside and the outside from one another. The gas-permeable membrane has a circular functional surface delimited by a first outside diameter. A sealing lip sealingly contacts a sealing surface of the cage with elastic preloading, and is configured to lift off the sealing surface and be brought into an open position to provide a flow-conducting connection between the inside and the outside for emergency degassing of the inside.

3 Claims, 1 Drawing Sheet

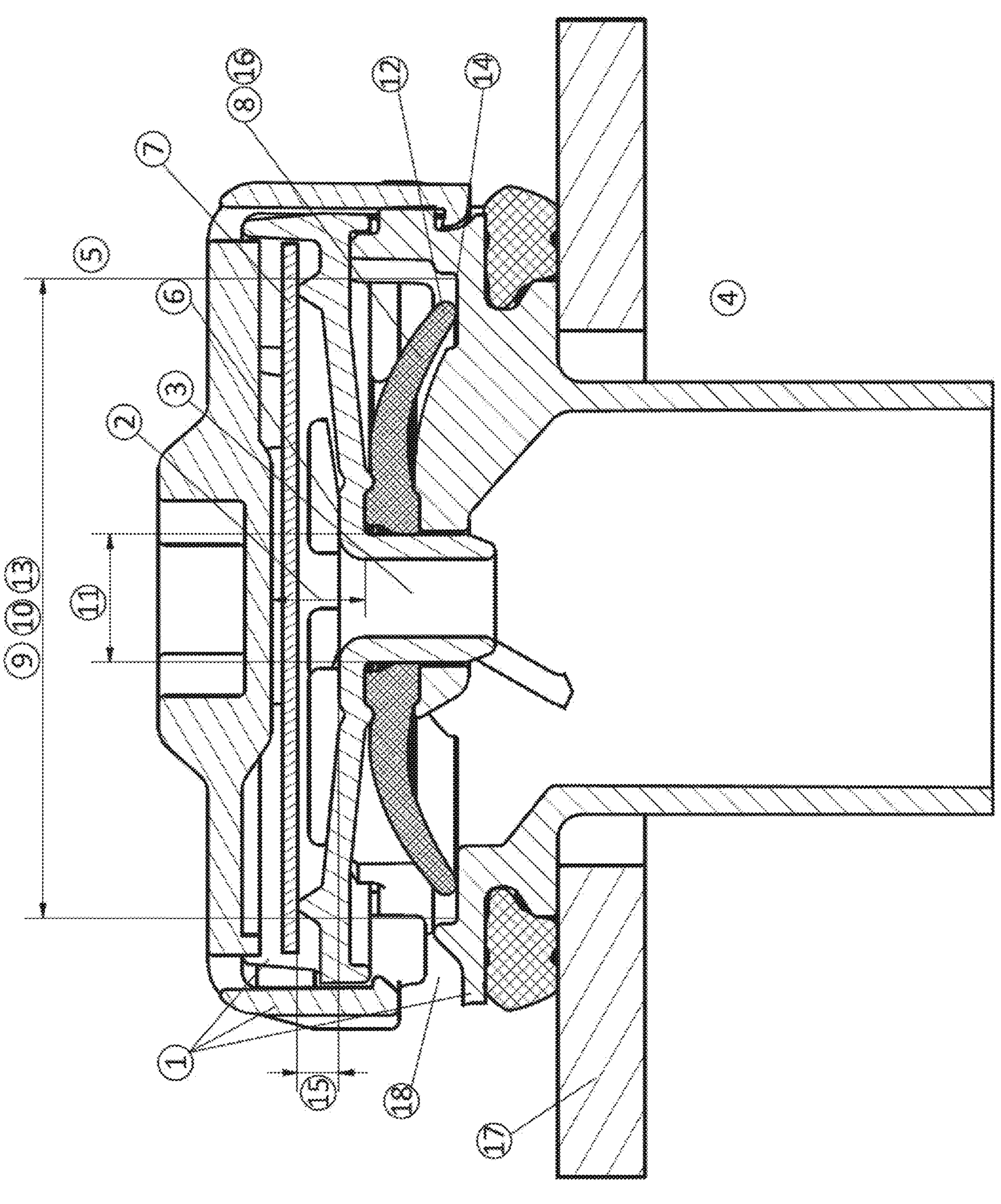
1
2
3
4
5
6
7
8
9
10
11
12
13
14
15
16
17
18

PRESSURE-EQUALIZING DEVICE AND HOUSING HAVING SAME

CROSS REFERENCE TO RELATED APPLICATIONS

This application claims benefit to German Patent Application No. DE 10 2024 120 985.2, filed on Jul. 24, 2024, which is hereby incorporated by reference herein.

FIELD

The invention relates to a pressure-equalizing device and to a housing having same.

BACKGROUND

A pressure-equalizing device and a housing having same are known from EP 3 385 584 B1. The functional parallel configuration of the membrane and pressure-relief valve allows the membrane to remain undamaged even in the event of emergency degassing of the inside, with the result that the membrane of the pressure-equalizing device, and hence the pressure-equalizing device itself, can continue to be used in the same way subsequent to emergency degassing. The membrane and the pressure-relief valve are arranged coaxially to one another in such a way that the first outside diameter of the functional surface of the membrane substantially corresponds to the inside diameter of the pressure-relief valve. The membrane is arranged directly on the end face, which faces toward the outside, of the gas passage opening, with the result that the functional surface of the membrane corresponds to the cross section of the gas passage opening. During the use of the pressure-equalizing device as intended, that is to say when the pressure difference between the inside and outside is noncritical and emergency degassing of the inside is not required, what is generally important is that the membrane has the highest possible permeability. At the same time, a high degree of resistance to a water pressure from the outside is advantageous.

If only little assembly space is available for the pressure-equalizing device, in particular if the diameter of the pressure-equalizing device is limited by its installation space and is only very small, the functional surface of the membrane would also be correspondingly small in the case of the previously known pressure-equalizing device, with the result that, in this case, pressure equalization between the inside and the outside no longer functions satisfactorily during the use of the pressure-equalizing device as intended.

The previously known pressure-equalizing device can be used in housings which enclose electronic components or a chemical reactor.

SUMMARY

In an embodiment, the present disclosure provides a pressure-equalizing device comprising a lattice-like cage with a gas passage opening through which gas can flow in a throughflow direction and which connects an inside and an outside of the pressure-equalizing device in a flow-conducting manner. The gas passage opening has an end face which faces toward the outside and which is covered by a gas-permeable membrane. The gas-permeable membrane is assigned a pressure-relief valve, which takes a form of a burst protector, in a functional parallel configuration. The gas-permeable membrane and the pressure-relief valve jointly spatially separate the inside and the outside from one another. The gas-permeable membrane has a circular functional surface which is delimited by a first outside diameter. The pressure-relief valve is circular ring-shaped, with an inside diameter which sealingly encloses the gas passage opening on an outer circumference, and with a sealing lip with a second outside diameter. The sealing lip sealingly contacts a sealing surface of the cage with elastic preloading, and is configured to lift off the sealing surface and be brought into an open position to provide a flow-conducting connection between the inside and the outside for emergency degassing of the inside. The end face and the gas-permeable membrane are assigned adjacently to one another with a clearance in the throughflow direction. The first outside diameter of the functional surface substantially corresponds to the second outside diameter of the sealing lip.

BRIEF DESCRIPTION OF THE DRAWING

Subject matter of the present disclosure will be described in even greater detail below based on the exemplary FIGURE. All features described and/or illustrated herein can be used alone or combined in different combinations. The features and advantages of various embodiments will become apparent by reading the following detailed description with reference to the attached drawing, which illustrate the following:

FIG. 1 is a schematic illustration showing an exemplary embodiment of a pressure-equalizing device.

DETAILED DESCRIPTION

In an embodiment, the present disclosure provides a pressure-equalizing device of the type stated at the outset and a housing having same in such a way that the pressure-equalizing device ensures good pressure equalization even if the outside diameter of the pressure-equalizing device is only small. The area of the membrane that is effective for the breathing function should be maximized with respect to the area of the pressure-relief valve that is effective for an emergency degassing function.

In order to achieve the foregoing, a pressure-equalizing device and a housing having such a pressure-equalizing device are provided in which the end face and the membrane are assigned adjacently to one another with a clearance in the throughflow direction, the first outside diameter of the functional surface substantially corresponding to the second outside diameter of the sealing lip.

The two outside diameters are substantially identical.

It is advantageous here that the functional surface of the membrane is substantially larger than the passage cross section through the gas passage opening.

The functional surface is also maximized with respect to the outside diameter of the pressure-equalizing device.

With respect to the outside diameter of the pressure-equalizing device, not only is the breathing function of the membrane maximized, but also the emergency degassing rate through the pressure-relief valve, by virtue of the embodiment according to the present disclosure.

The ratio of first outside diameter and second outside diameter is preferably 0.9 to 1.1. This ratio has the effect that the functional surface and the pressure-relief valve have substantially the same outside diameters and, as a result, the interior space in the cage is utilized to a maximum both for the membrane and for the pressure-relief valve. The functional surface of the membrane and the emergency degassing rate through the pressure-relief valve are thus in each case maximum with respect to the diameter of the pressure-equalizing device.

The pressure-relief valve can take the form of a screen which is curved forward convexly in the direction of the outside and can consist of a rubber-elastic sealing material. By virtue of the convex forward curvature of the screen, the sealing lip bears sealingly on the sealing surface of the cage with elastic preloading. During the normal use of the pressure-equalizing device as intended, breathing takes place between the inside and the outside exclusively through the functional surface of the membrane. Here, the pressure-relief valve is closed.

It is only when the pressure difference between the inside and the outside exceeds a threshold value that the pressure-relief valve opens, with the result that the subsequent pressure equalization reliably prevents destruction of the membrane. The functional parallel configuration of the membrane and the pressure-relief valve results in effective burst protection for the membrane.

The present disclosure also relates to a housing which comprises a pressure-equalizing device, as described above. The pressure-equalizing device according to the present disclosure is suitable in principle for all components having closed housings in which pressure differences between the inside and the outside could lead to damage to or failure of the component. At the same time, the membrane ensures that no water and/or no contamination can pass from the outside to the inside.

The housing may, for example, be formed by a battery housing, an inverter, an electric motor or an automobile headlight, with the housing generally having an enclosed dead volume.

In a hermetically sealed housing, it is possible, as a result of heating/cooling during operation, or as a result of atmospheric air pressure fluctuations, for both positive and negative pressures to occur in the interior of the housing.

Housings are increasingly constructed to be lighter and thus to have thinner walls, and therefore, given their thin walls, the housings must be protected from undesirably high pressure differences. This is the reason for the pressure-equalizing device being provided. Owing to the pressure-equalizing element, pressure peaks can be diminished, and the possible pressure loading on the housing is thus reduced in a defined manner. Essential requirements for a well-functioning pressure-equalizing device are good gas permeability during normal operation, high gas permeability from inside to outside during emergency degassing, high water tightness, good dirt resistance to oils and dust, and good mechanical robustness.

As illustrated in FIG. 1, the pressure-equalizing device can be used for all types of housings 17 in which undesired pressure differences between the inside 4 and the outside 5 are to be avoided.

The pressure-equalizing device is inserted into the housing 17, which is schematically illustrated.

The pressure-equalizing device comprises the lattice-like cage 1, which, for example, can consist of a hard and tough polymer material. The cage 1 has a gas passage opening 3 through which gas can flow, the throughflow direction being provided with the reference sign 2. The gas passage opening 3 connects the inside 4 and the outside 5 to one another in a flow-conducting manner, the gas passage opening 3 being cylindrical in the exemplary embodiment shown.

If the membrane 7 were to be in direct bearing contact with the end face 6, which faces toward the outside 5, of the gas passage opening 3, the functional surface 10 thereof would be only comparatively small and would substantially correspond to the opening cross section of the gas passage opening 3.

In order to improve the breathing function of the pressure-equalizing device according to the present disclosure, there is therefore provision according to the present disclosure that the end face 6 and the gas-permeable membrane 7 are assigned adjacently to one another with a clearance 15 in the throughflow direction 2. As a result, the functional surface 10 of the membrane 7 is substantially increased in comparison to the passage cross section through the gas passage opening 3, and the breathing function of the pressure-equalizing device is improved.

To maximize the functional surface 10, there is provision that the first outside diameter 9 thereof substantially corresponds to the second outside diameter 13 of the sealing lip 12. In the exemplary embodiment shown, the ratio of first outside diameter 9 and second outside diameter 13 is substantially 1. The interior space 18 of the cage 1 is thus utilized to a maximum both by the membrane 7 and by the pressure-relief valve 8. The outside diameters 9, 13 each extend almost up to the inner boundary of the interior space 18.

Such maximum utilization of the interior space 18 by outside diameters 9, 13 which are each as large as possible is of outstanding advantage particularly when the pressure-equalizing device is only small overall and has only a small outside diameter. For good use properties both in terms of the breathing function and in terms of the emergency degassing rates, largest possible outside diameters 9, 13, with respect to the size of the interior space 18, are of outstanding advantage.

The membrane 7 is assigned the pressure-relief valve 8, which takes the form of a burst protection means, in a functional parallel configuration, the membrane 7 and the pressure-relief valve 8 jointly spatially separating the inside 4 and the outside 5 from one another.

The inside diameter 11 of the pressure-relief valve 8 sealingly encloses the gas passage opening 3 on its outer circumference in order to prevent a flow short circuit in this region. During the use as intended, in normal operation, air exchange between the inside 4 and the outside 5 takes place exclusively through the functional surface 10 of the membrane 7. The pressure-relief valve 8 comprises the sealing lip 12 with the second outside diameter 13, the sealing lip 12 sealingly contacting the sealing surface 14 of the cage 1 with elastic preloading. For emergency degassing of the inside 4, the sealing lip 12 lifts off the sealing surface 14. Subsequent to the pressure equalization, the sealing lip 12 of the pressure-relief valve 8, which valve is formed by the screen 16 which is curved forward convexly in the direction of the outside 5 and consists of rubber-elastic sealing material, bears sealingly again onto the sealing surface 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A pressure-equalizing device, comprising:

a lattice-like cage with a gas passage opening through which gas can flow in a throughflow direction and a sealing surface, the gas passage opening connecting an inside and an outside of the pressure-equalizing device in a flow-conducting manner, wherein the gas passage opening comprises an end face facing toward the outside and is covered by a gas-permeable membrane, wherein the gas-permeable membrane comprises a circular functional surface that is delimited by a first outside diameter and is assigned a pressure-relief valve, wherein the pressure-relief valve comprises a burst protector and is circular ring-shaped, with an inside diameter which sealingly encloses the gas passage opening on an outer circumference, and with a sealing lip with a second outside diameter, the gas-permeable membrane and the pressure-relief valve being in a functional parallel configuration, and wherein the gas-permeable membrane and the pressure-relief valve jointly spatially separate the inside and the outside from one another, wherein the sealing lip sealingly contacts the sealing surface with elastic preloading, and is configured to lift off the sealing surface and be brought into an open position to provide a flow-conducting connection between the inside and the outside for emergency degassing of the inside, wherein the end face and the gas-permeable membrane are assigned adjacently to one another with a clearance in the throughflow direction, and wherein the first outside diameter of the circular functional surface substantially corresponds to the second outside diameter of the sealing lip, and wherein a ratio of the first outside diameter to the second outside diameter is 0.9 to 1.1.

2. The pressure-equalizing device as claimed in claim 1, wherein the pressure-relief valve is formed as a screen which is curved forward convexly in a direction of the outside and comprises a rubber-elastic sealing material.

3. A housing, comprising the pressure-equalizing device as claimed in claim 1.

* * * * *